No. 858,497. PATENTED JULY 2, 1907.
W. E. BARNES.
VALVE.
APPLICATION FILED MAR. 15, 1906.
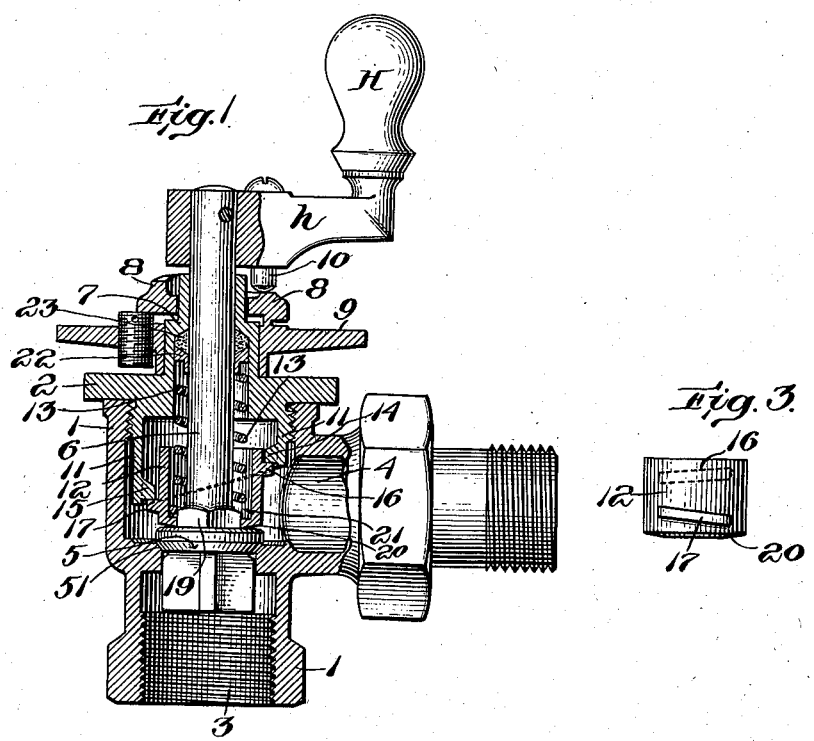
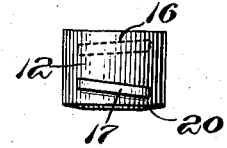
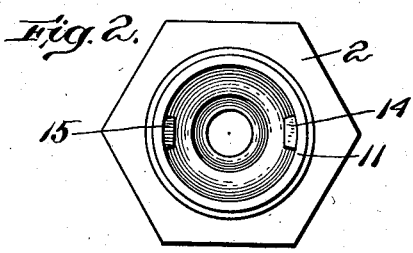
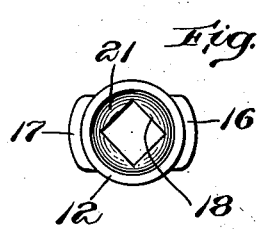
Witnesses:
Inventor:
Walter Esmond Barnes,
by Roberts & Mitchell
Attorneys

UNITED STATES PATENT OFFICE.

WALTER ESMOND BARNES, OF MALDEN, MASSACHUSETTS, ASSIGNOR TO THERMOGRADE VALVE COMPANY, OF BOSTON, MASSACHUSETTS, A CORPORATION OF MAINE.

VALVE

No. 858,497.  Specification of Letters Patent.  Patented July 2, 1907.

Application filed March 15, 1906. Serial No. 306,179.

*To all whom it may concern:*

Be it known that I, WALTER ESMOND BARNES, a citizen of the United States, and a resident of Malden, in the county of Middlesex and State of Massachusetts, have invented new and useful Improvements in Valves, of which the following is a specification.

My invention relates to valves, and particularly to control valves for steam radiators in steam-heating systems.

My invention consists in certain improvements upon valves of the character shown in the patent to F. Tudor, No. 705,981, dated July 29, 1902, to which patent reference is made for a full description of the adaptation and use of such valves in low pressure steam heating systems. In such valves as that shown in said Tudor patent, the closing of the valve upon the valve seat is wholly dependent upon the efficiency of the spring which urges the valve toward the valve seat. The opening movement of such valve is positive and the closing movement thereof is yielding. In case, therefore, a bit of scale or dirt should lodge between the valve and valve seat, and the strength of the spring urging the valve toward the valve seat were insufficient to crush the same, the valve would not fully close but would be held by the foreign substance out of engagement with the valve seat, causing the valve to leak.

The principal object of my invention is to provide means positively to effect a final closing of the valve upon the valve seat, without having the whole operation of the valve positive, or discarding the advantages of the spring and cam controlled valve of the kind shown in said Tudor patent.

In the accompanying drawings which illustrate an embodiment of my invention: Figure 1 is a vertical longitudinal section, partly in elevation, of a valve fitting containing my invention. Fig. 2 is a view of the screw cap presently to be described, viewed from underneath. Fig. 3 is an elevation of the sleeve or thimble mounted on the valve stem; and Fig. 4 is a plan view of the thimble shown in Fig. 3.

The valve body comprises the valve casing 1, interiorly threaded at its upper end as shown, and the screw cap 2, exteriorly threaded and screwed within the casing 1. The valve body is provided with an inlet 3 from which steam is taken from the riser-pipe and an outlet 4 which leads to the radiator. The passage between the openings 3 and 4 is controlled by the valve 5. The valve seat is shown at 51. The valve 5 is provided with a valve stem 6 which passes through the packing gland 7 forming a part of the screw cap 2. Upon the outer end of the valve stem 6 a handle H is secured. Upon the top of the valve body is secured a cam 8 which is mounted on the flange 9. The cam 8 co-operates with a cam follower 10 secured to the valve stem 6 through the arm h of handle H. As the handle H is turned in the direction of the rise of the cam 8 it causes the valve stem to be raised as it is turned, and the valve 5 to be lifted from its seat. The valve opening and the pitch of the cam 8 are so proportioned that within the limits of a single revolution of the valve handle, the valve may gradually be opened to admit to the radiator the quantity of steam required under any given condition. The development of the cam may be such as that fully described in said Tudor patent, and the details thereof are not essential to an understanding of the present invention.

Extending from the screw cap 2 into the casing 1 is a skirt 11 preferably cast integral with said screw cap and surrounding the valve stem. Mounted on the valve stem so as to turn with it is the cup-shaped sleeve or thimble 12, the interior of which provides a socket 21 for the coil spring 13 surrounding the stem and abutting at one end against the thimble 12 and at the other end against the packing ring or follower 22. The packing is shown at 23. The spring 13 thus in effect abuts against the valve body, the packing ring and packing being interposed between. Spring 13 yieldingly urges the valve 5 toward the valve seat 51, and is of sufficient strength to overcome any ordinary pressure in the riser-pipe. It often occurs however, that scale or other foreign matter will lodge between the valve and valve seat thus preventing the complete closure of the valve in case the obstructive particle is of such a nature that it cannot be crushed by the strength of spring 13. To effect a positive final closing of the valve upon the valve seat, I provide projections fixed within the valve casing and projections carried by the valve stem, having cam surfaces and co-operating with each other so as to operate to force the valve upon the valve seat in its final movement, thus effecting a positive closing of the valve, but which are inoperative during the opening movement of the valve. The projections fixed within the valve body as aforesaid are shown at 14 and 15. These preferably consist of lugs cast integral with the skirt 11. The co-operating projections carried by the valve stem are shown at 16 and 17. These projections are lugs cast integral with the thimble or sleeve 12, and are provided with cam surfaces to co-operate with the lugs 14 and 15, respectively, being so placed and having such pitch as to come into action only after the valve 5 has approximately reached its seat, and finally to force the valve positively upon its seat with the last closing movement of the valve handle H. The co-operating projections of each pair, that is, the pair 14 and 16, and the pair 15 and 17, are offset from one another longitudinally of the valve stem as shown, so that during the rotation of the valve the projection or cam 16 will not collide with the projection 15, but will pass it by, and the projection or cam 17 will not collide with the projection 14, but will pass it by.

The thimble 12 has a square aperture 18 through which the valve stem 6 passes and the valve stem 6 at the part surrounded by the thimble 12 is also made square as shown at 19, so that the thimble will positively turn with the valve stem. The thimble is otherwise loosely mounted on the stem, and the end of the thimble abutting against the valve 5 is convex in form, as shown at 20, so that it may rock slightly if necessary and adjust itself to any unevenness or inaccuracies in the structure or in the operation of the parts.

I claim:

1. In a valve body, a valve seat, a rotatable valve and its stem, means gradually to open said valve, means yieldingly to urge the valve toward the valve seat, a projection fixed within the valve body, and a projection co-operating therewith carried by the valve stem, said projections being adapted positively to effect the final closing of the valve upon the valve seat.

2. In a valve body, a valve seat, a rotatable valve and valve stem, a cam fixed to the valve body about the valve stem, a cam follower secured to the valve stem co-operating with the cam to open the valve, a spring yieldingly urging the valve toward the valve seat, a projection fixed within the valve body, and a co-operating projection carried by the valve stem, one of said projections having a cam surface, and said projections being relatively so arranged as to positively effect the final closing of the valve upon its seat.

3. In a valve body, a valve seat, a rotatable valve and valve stem, a cam fixed to the valve body about the valve stem, a cam follower secured to the valve stem co-operating with the cam to open the valve, a spring yieldingly urging the valve toward the valve seat, two projections fixed within the valve body on opposite sides thereof, two projections carried by the valve stem and co-operating with the projections fixed within the valve body, one of each pair of co-operating projections having a cam surface, said projections being adapted to positively effect the final closing of the valve upon its seat, and the projections of each pair being offset with relation to the other pair longitudinally of the valve stem, whereby the projections fixed to the valve stem will pass the projections fixed within the valve body when the valve stem is rotated to open the valve.

4. In a valve body, a valve seat, a rotatable valve having a valve stem, a cam fixed to the valve body about the valve stem, a cam follower secured to the valve stem co-operating with said cam to open the valve, a sleeve mounted on the valve stem to turn therewith, a spring between the sleeve and the valve body yieldingly urging the valve toward the valve seat, projections fixed within the valve body, projections upon the sleeve co-operating with said first named projections, one of each pair of co-operating projections having a cam surface, and said projections being adapted to positively effect the final closing of the valve upon its seat.

5. In a valve body, the valve casing closed at its upper end by a screw cap, a valve seat, a rotatable valve having a valve stem, a cam fixed to the valve body about the valve stem, a cam follower secured to the valve stem co-operating with said cam to open the valve, a spring yieldingly urging the valve toward the valve seat, a skirt extending from the screw cap into the casing and surrounding the valve stem, projections fixed within said skirt, projections carried by the valve stem co-operating with said first named projections, one of each pair of co-operating projections having a cam surface, said projections being adapted to positively effect the final closing of the valve upon its seat.

6. In a valve body, a valve seat, a rotatable valve having a valve stem, a cam fixed to the valve body about the valve stem, a cam follower secured to the valve stem co-operating with the cam to open the valve, a thimble mounted upon and turning with the valve stem and having a convex end surface abutting against the top of the valve proper, a coil spring surrounding the valve stem between the valve body and the thimble and yieldingly urging the valve toward the valve seat, projections fixed within the valve body, and projections upon the thimble co-operating with said first named projections, one of each pair of co-operating projections having a cam surface, said projections being adapted to positively effect the final closing of the valve upon its seat.

7. In a valve body, the valve casing closed at its upper end by a screw cap, a valve seat, a rotatable valve and its stem, a cam fixed to the screw cap about the valve stem, a cam follower secured to the valve stem co-operating with said cam to open the valve, a thimble mounted upon and turning with the valve stem and abutting against the upper surface of the valve, a coil spring surrounding the valve stem, one end of which abuts against the thimble within the socket formed thereby and the other end of which abuts against the screw cap yieldingly urging the valve toward its valve seat, a skirt extending from the screw cap into the casing and surrounding said valve stem and spring, lugs upon said skirt, and cams upon said thimble adapted to co-operate with said lugs and positively to effect the final closing of the valve upon the valve seat.

Signed by me at Boston, Massachusetts, this thirteenth day of March, 1906.

WALTER ESMOND BARNES.

Witnesses:
ROBERT CUSHMAN,
JOSEPH T. BRENNAN.